US009699450B2

(12) United States Patent
Zhang et al.

(10) Patent No.: US 9,699,450 B2
(45) Date of Patent: Jul. 4, 2017

(54) INTER-VIEW PREDICTED MOTION VECTOR FOR 3D VIDEO

(71) Applicant: QUALCOMM Incorporated, San Diego, CA (US)

(72) Inventors: Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 14/045,705

(22) Filed: Oct. 3, 2013

(65) Prior Publication Data

US 2014/0098882 A1  Apr. 10, 2014

Related U.S. Application Data

(60) Provisional application No. 61/709,912, filed on Oct. 4, 2012.

(51) Int. Cl.
*H04N 7/12* (2006.01)
*H04N 11/02* (2006.01)
*H04N 11/04* (2006.01)
*H04N 19/44* (2014.01)
*H04N 13/00* (2006.01)
*H04N 19/597* (2014.01)
*H04N 19/105* (2014.01)
*H04N 19/52* (2014.01)
*H04N 19/513* (2014.01)
*H04N 19/119* (2014.01)

(52) U.S. Cl.
CPC ... *H04N 19/00533* (2013.01); *H04N 13/0048* (2013.01); *H04N 19/105* (2014.11); *H04N 19/119* (2014.11); *H04N 19/52* (2014.11); *H04N 19/521* (2014.11); *H04N 19/597* (2014.11)

(58) Field of Classification Search
CPC ........... H04N 19/00533; H04N 19/119; H04N 19/521; H04N 19/52; H04N 19/597; H04N 19/105; H04N 13/0048
USPC ........................................ 375/240.01–240.29
See application file for complete search history.

(56) References Cited

U.S. PATENT DOCUMENTS

2011/0013697 A1   1/2011  Choi et al.
2012/0163466 A1   6/2012  Sugio et al.
(Continued)

FOREIGN PATENT DOCUMENTS

WO   WO2011/127966   * 10/2011
WO       2011146451 A1  11/2011
(Continued)

OTHER PUBLICATIONS

"HEVC Extension for Multiview Video Coding and Multiview Video plus Depth Coding"; Bartnik; Feb. 2012.*
(Continued)

*Primary Examiner* — Jared Walker
(74) *Attorney, Agent, or Firm* — Shumaker & Sieffert, P.A.

(57) ABSTRACT

For a depth block in a depth view component, a video coder derives a motion information candidate that comprises motion information of a corresponding texture block in a decoded texture view component, adds the motion information candidate to a candidate list for use in a motion vector prediction operation, and codes the current block based on a candidate in the candidate list.

43 Claims, 6 Drawing Sheets

(56) References Cited

U.S. PATENT DOCUMENTS

| | | | |
|---|---|---|---|
| 2012/0328021 A1* | 12/2012 | Sugio | H04N 19/56 375/240.16 |
| 2013/0022117 A1 | 1/2013 | Lou et al. | |
| 2013/0077691 A1 | 3/2013 | Zheng et al. | |
| 2013/0229485 A1* | 9/2013 | Rusanovskyy | H04N 13/0048 348/43 |
| 2013/0342644 A1* | 12/2013 | Rusanovskyy | H04N 19/597 348/43 |

FOREIGN PATENT DOCUMENTS

| | | |
|---|---|---|
| WO | 2012059577 A1 | 5/2012 |
| WO | 2013030456 A1 | 3/2013 |

OTHER PUBLICATIONS

Bartnik et al., "HEVC Extension for Multiview Video Coding and Multiview Video plus Depth Coding," VCEG Meeting, MPEG Meeting; Feb. 3-10, 2012; San Jose, CA (Video Coding Experts Group of ITU-T SG.16), No. VCEG-AR13, XP030003856, 42 pp.

Tech et al.,"3D-HEVC Test Model 1," JCT-3V Meeting, MPEG Meeting, Jul. 16-20, 2012; Stockholm, SE, (Joint Collaborative Team on 3D Video Coding Extension Development of ITU-T SG.16 WP3 and ISO/IEC JTC 1/SC 29/WG11), XP030130183, Retrieved from the Internet: URL: http://PHENIX.INT-EVRY.FR|JCT2/, No. JCT3V-A1005,_d0, 83 pp. [uploaded in parts].

International Preliminary Report on Patentability from International Application No. PCT/US2013/063398, dated Dec. 19, 2014, 13 pp.

Tao et al., "Joint Texture and Depth Map Video Coding Based on the Scalable Extension of H.264/AVC," Circuits and Systems, 2009. ISCAS 2009, IEEE International Symposium on, IEEE, Piscataway, NJ, USA, May 24, 2009, pp. 2353-2356.

Liu et al., "Texture video-assisted motion vector predictor for depth map coding," SPIE, PO Box 10 Bellingham WA 98227-0010, USA, vol. 50, Aug. 1, 2011, XP040562592, 4 pp.

Bang et al., "Description of 3D video coding technology proposal by ETRI and Kwangwoon University," MPEG Meeting; Nov. 28, 2011-Dec. 2, 2011; Geneva, CH; (Motion Picture Expert Group or ISO/IEC JTC1/SC29/WG11), No. M22625, XP030051188, 26 pp.

Bartnik et al., "HEVC Extension for Multiview Video Coding and Multiview Video plus Depth Coding," ITU—Telecommunications Standardization Sector Study Group 16 Question 6 Video Coding Experts Group (VCEG), 44nd Meeting: San Jose, CA, USA, Feb. 3-10, 2012, Document VCEG-AR13, 42 pp.

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "Description of 3D Video Coding Technology Proposal by Qualcomm Incorporated," MPEG Meeting; Nov. 28, 2011-Dec. 2, 2011; Geneva, CH; (Motion Picture Expert Group or ISO/IEC JTC1/SC29/WG11), No. m22583, XP030051146, 21 pp.

International Search Report and Written Opinion—PCT/US2013/063398—ISA/EPO—Dec. 11, 2013, 17 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jung, et al., "TE11 Report on experiment 3.3.b: 'temporally oriented' set of predictors for MV-Competition," JCT-VC Meeting; MPEG Meeting; Oct. 7, 2010-Oct. 15, 2010; Guangzhou, CN; (Joint Collaborative Team on Video Coding of ITU-T SG.16 WP3 and ISO/IECJTC1/SC29/WG11); URL: http://wftp3.itu.int/av-arch/jctvc-site/, No. JCTVC-C291, XP030007998, 4 pp.

Oh et al., "H.264-Based Depth Map Sequence Coding Using Motion Information of Corresponding Texture Video," Gwangju Institute of Science and Technology (GIST), Korea, 2006, pp. 898-907, 10 pp.

Schwarz H. et al., "3D Video Coding Using Advanced Prediction, Depth Modeling, and Encoder Control Methods," 2012 Picture Coding Symposium, May 7-9, 2012, Krakow, Poland, 4 pp.

Tao et al., "Joint Texture and Depth Map Video Coding Based on the Scalable Extension of H.264/AVC," Circuits and Systems, 2009. ISCAS 2009. IEEE International Symposium on, IEEE, Piscataway, NJ, USA, May 24, 2009, XP031479714, pp. 2353-2356, 4 pp.

Tech et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pp.

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

ITU-T H.265, Series H: Audiovisual and Multimedia Systems, Infrastructure of audiovisual services—Coding of moving video, High efficiency video coding, The International Telecommunication Union. Apr. 2013, 317 pp.

Second Written Opinion from International Application No. PCT/US2013/063398, dated Sep. 26, 2014, 6 pp.

ITU-T H.263, "Video coding for low bit rate communication," Series H: Audiovisual and Multimedia Systems, Infrastructure of audiovisual services—Coding of moving video, Jan. 2005, 226 pp.

ITU-T H.264, "Video coding for low bit rate communication," Series H: Audiovisual and Multimedia Systems, Infrastructure of audiovisual services—Coding of moving video, Mar. 2005, 343 pp.

Bross et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 2013, which as of Sep. 30, 2013, is available from http://phenix.int-evry.fr/jct/doc_end_user/documents/13_Incheon/wg11/JCTVC-M0432-v3.zip, 310 pp.

\* cited by examiner

INTER-VIEW PREDICTED MOTION VECTOR FOR 3D VIDEO

This application claims the benefit of U.S. Provisional Application No. 61/709,912, filed 4 Oct. 2012, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for improving coding efficiency of motion prediction in multi-view and 3D video coding.

In one example, a method of decoding 3D video data includes, for a depth block in a depth view, deriving a motion information candidate, wherein the motion information candidate comprises motion information of a corresponding texture block in a decoded texture view; adding the motion information candidate to a candidate list for use in a motion vector prediction operation, wherein each candidate in the candidate list has an associated index; and, decoding the current block based on a candidate in the candidate list.

In another example, a method of encoding 3D video data includes, for a depth block in a depth view component, deriving a motion information candidate, wherein the motion information candidate comprises motion information of a corresponding texture block in a decoded texture view component; adding the motion information candidate to a candidate list for use in a motion vector prediction operation; and, encoding the current block based on a candidate in the candidate list.

In another example, a device for coding video data includes a video decoder configured to, for a depth block in a depth view component, derive a motion information candidate, wherein the motion information candidate comprises motion information of a corresponding texture block in a decoded texture view component; add the motion information candidate to a candidate list for use in a motion vector prediction operation; and, decode the current block based on a candidate in the candidate list.

In another example, a device for coding video data includes a video encoder configured to, for a depth block in a depth view component, derive a motion information candidate, wherein the motion information candidate comprises motion information of a corresponding texture block in a decoded texture view component; add the motion information candidate to a candidate list for use in a motion vector prediction operation; encode the current block based on a candidate in the candidate list.

In another example, a computer-readable storage medium stores instructions that when executed by one or more processors cause the one or more processors to, for a depth block in a depth view component, derive a motion information candidate, wherein the motion information candidate comprises motion information of a corresponding texture block in a decoded texture view component; add the motion information candidate to a candidate list for use in a motion vector prediction operation; and, decode the current block based on a candidate in the candidate list.

In another example, an apparatus for encoding 3D video data includes means for deriving a motion information candidate for a depth block in a depth view component, wherein the motion information candidate comprises motion information of a corresponding texture block in a decoded texture view component; means for adding the motion information candidate to a candidate list for use in a motion vector prediction operation; and, means for encoding the current block based on a candidate in the candidate list.

The details of one or more examples are set forth in the accompanying drawings and the description below. Other features, objects, and advantages will be apparent from the description and drawings, and from the claims.

DETAILED DESCRIPTION

Figure 1:
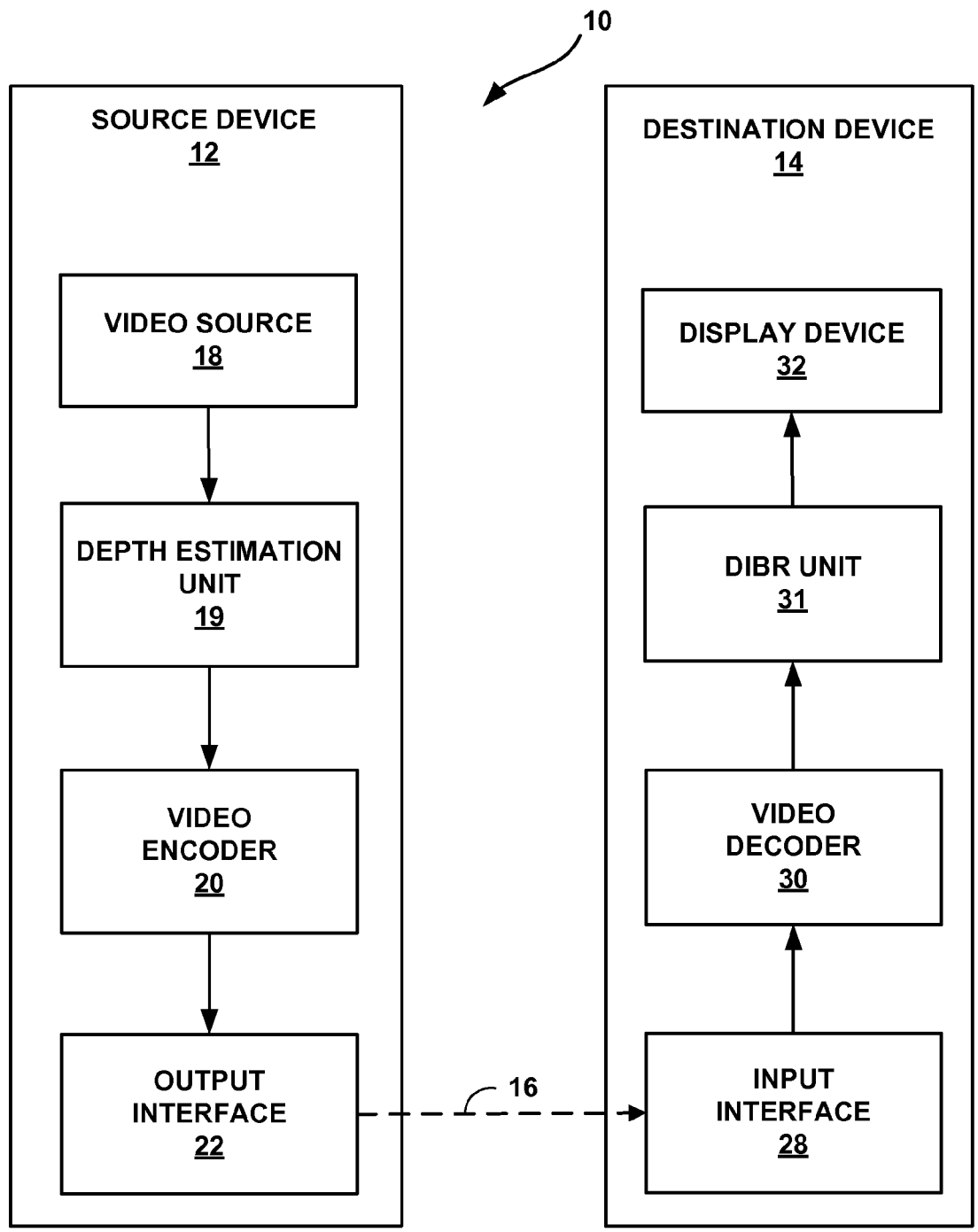
FIG. 1 is a block diagram illustrating an example video encoding and decoding system that may utilize the inter-prediction techniques of this disclosure.

This disclosure describes techniques related to the signaling of motion parameters in multiview video coding, including in the newly emerging three-dimensional, high efficiency video coding (3D-HEVC) standard. The newly emerging 3D-HEVC standard is a 3D video coding standard that extends many of the base HEVC coding techniques to 3D video data. While the techniques of this disclosure may at times be described with specific reference to HEVC and 3D-HEVC and may at times use HEVC and 3D-HEVC terminology, it should be understood that the techniques of this disclosure are not limited to any particular coding standard. The techniques of this disclosure may potentially be applicable to any multiview or 3D video coding standard.

Video compression techniques for both 2D video and 3D video can include predicting a current block of video data based on an already coded block of video data. In this disclosure, the term current block generally refers to a block of video data currently being coded (e.g. encoded or decoded), as opposed to video blocks that are already coded or video blocks that are yet to be coded. In an intra prediction mode, the current block is predicted based on an already coded block in the same picture as the current block, while in an inter prediction mode the current block is predicted based on an already coded block in a different picture. The different picture may be either a picture of a different time instance from the same view as the current block or may be a picture from the same time instance but from a different view or view component.

When a video decoder performs inter prediction for a given video block, motion parameters are signaled in an encoded video bitstream. The motion parameters include, for example, one or more motion vectors, one or more reference picture indexes, and a prediction direction so that the video decoder can determine which block in which picture to use as the predictive block for the current block. A video coder may use various modes for signaling motion parameters in an encoded bitstream. In order to reduce the number of bits needed to implement inter-predictive coding, some of those modes may utilize prediction of motion parameters instead of explicit signaling of motion parameters.

In the developing HEVC standard, there are various modes for the prediction of motion parameters, one of which is referred to as merge mode. In merge mode, a video coder constructs a candidate list of motion parameters (e.g., reference pictures and motion vectors) using candidates from neighboring blocks, including spatial neighboring blocks and temporal neighboring blocks, and in the case of 3D-HEVC also including inter-view neighboring blocks. The chosen motion parameters are signaled from a video encoder to a video decoder by transmitting an index of the selected candidate from the candidate list. At the video decoder, once the index is decoded, all the motion parameters of the corresponding block of the selected candidate are inherited from the merge candidate to which the index corresponds. A video encoder and video decoder are configured to construct the same candidate lists based on already coded blocks. Therefore, based on the index, the video decoder can identify the motion parameters of the candidate selected by the video encoder. For the skip mode in HEVC, the same merge candidate list is generated as for merge mode. In skip mode, however, no residual data is signaled from the video encoder to the video decoder. In this disclosure, all techniques described relative to merge mode may also be applied to the skip mode.

Advanced motion vector prediction (AMVP) mode is similar to merge mode in that a video encoder and video decoder implement a common, pre-defined process to evaluate the motion information (e.g., reference indices and motion vectors) of neighboring candidate blocks and construct a candidate list for a current video block based on the evaluated motion information. However, the pre-defined list construction process for AMVP can be different than that for merge mode. Additionally, for AMVP, the current video block does not inherit all of the candidate motion information. Rather, in AMVP, a video decoder uses the motion vector from the selected candidate block, after scaling if necessary, as a motion vector predictor. The video decoder also receives the reference picture indexes, motion vector difference information, as well as the prediction direction if needed, and thus, using the motion vector predictor and the motion vector difference, the video decoder determines new motion vector(s) to use for coding the current video block. Thus, AMVP may provide greater video coding fidelity for the video block, by explicitly signaling more motion information for the video block, at the cost of reduced bit stream efficiency relative to merge mode.

Motion parameter inheritance (MPI) is a coding tool for a depth view component in 3D-HEVC that may be used in conjunction with merge mode. MPI may be enabled for a particular depth view component at, for example, a video parameter set (VPS) level using a flag (e.g., use_mvi_flag[i], where i identifies the particular depth view). When MPI is enabled (e.g., the "use_mvi_flag[i]" flag is set to 1), the motion information of a co-located block in an associated texture view component can be used to code at least one current block in a sequence of the depth view, where a sequence generally refers to one or more pictures and may correspond to a group of pictures. To signal whether MPI is used for a block (e.g., a prediction unit (PU)) in a depth view, a flag (denoted by "bMPIUsed") is included in the encoded bitstream for each block of the sequence.

When MPI is enabled (i.e., bMPIUsed is set equal to 1) for a current depth block, the current depth block inherits the motion vector, reference index, and associated coding structure (e.g., split information and/or partition information) of the co-located block in the texture view component. Thus, this flag is essentially treated as a special merge candidate with an index set equal to 0. This disclosure will generally use the term MPI candidate to refer to a candidate, such as a merge candidate or an AMVP candidate, that includes the motion information of a corresponding block in a texture view component. In some proposals for MPI, when the MPI candidate is selected, the current block inherits motion information (e.g., motion vectors, reference indexes) as well as coding structures. For other merge mode and AMVP candidates, a coding structure is typically not inherited. When an MPI candidate is included in the list, the indexes of other merge candidates (e.g., spatial/temporal/combined bi-predictive/zero motion vector merging candidates) are increased by 1, and the maximum size of the merge list is increased by 1 (e.g., from 5 to 6). In this disclosure, combined bi-predictive candidates, zero candidates, and other artificially generated candidates may be referred to collectively as virtual candidates. As the current block reuses the CU/PU structures and motion data from the texture when the MPI candidate is selected, additional buffers for CU/PU coding structures may be required for the MPI candidate.

Some implementations of MPI in 3D-HEVC always assume that the MPI candidate has a higher priority than all the other merge candidates which may reduce overall coding efficiency due to the fact that for some video sequences, the other merge candidates may be used more frequently than the MPI candidate. Furthermore, MPI directly reuses the motion information of co-located blocks in a base view, while in some instances it may be beneficial to instead use the motion information of the co-located block as a predictor of current motion information, as part of an AMVP mode for instance.

This disclosure proposes techniques related to MPI for use in 3D-HEVC. According to the techniques of this disclosure, instead of transmitting a flag indicating MPI is used and deriving the MPI candidate, including coding structure information, to have index equal to 0, a video coder may treat the motion information of the co-located block in a texture view as a merge candidate with a merge index signaled similar to other candidates in a merge list and with only motion information inherited. Thus, according to the techniques of this disclosure the MPI candidate may be included anywhere in a merge list. Additionally, according to the techniques of this disclosure, the MPI candidate may include only motion information instead of both motion information and coding structure information. In instances where a depth view block and a corresponding texture view block have different coding structures, the texture block to be used may be identified, for example, based on a co-located pixel. As one example, a pixel in a texture view component that is co-located relative to a center pixel of depth view block may be identified, and the texture block containing that pixel may be used as the depth blocks corresponding texture block. Pixels other than the center pixel may similarly be used for determining a corresponding a texture view block.

The MPI candidate may be added into the merge candidate list such that it has an index larger than 0, for example with an index equal to any of 1 through 5. Alternatively, the MPI candidate can be added right before a temporal merging candidate is added to the candidate list, added after the first spatial candidate is added into the merge candidate list, added after N spatial candidates have been checked, with N equal to 0, 1, 2 and 3. In some implementations, if an MPI candidate is treated as a merge candidate, the corresponding index could be adaptively changed within one slice, one picture, etc. Generally speaking, as long as the encoder and decoder are configured to construct the same candidate list, the MPI candidate can be added into any position in the candidate list using any variety of list construction methods.

According to another aspect of this disclosure, the motion information of the co-located block in the texture view could be used as an additional candidate for AMVP mode. When the MPI candidate it is treated as an AMVP candidate, the MPI candidate may, for example, replace an existing candidate, such as the temporal AMVP candidate, or alternatively, the AMVP candidate list size may be increased by 1. The index of MPI candidate, if used in an AMVP candidate list, may be any value of 0 to N−1, assuming the AMVP candidate list has N candidates.

Saying the MPI candidate is a specialized merge candidate with an index of 0, in respect to previously proposed MPI implementations, is intended to be explanatory and may or may not actually reflect processes performed by a video encoder or a video decoder. For example, in instances where a video encoder or decoder codes a block using the MPI candidate, the video encoder or decoder may not perform the full list construction process that is performed when a merge candidate other than the MPI candidate is selected. Instead, the video encoder or decoder may terminate the list construction process prior to completion or may not perform any list construction at all. In contrast, a video coder performing the techniques of this disclosure, includes the MPI candidate in a merge list, and therefore determines the MPI candidate as part of a merge list construction process.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device. Many of the techniques described in this disclosure can be performed by both video encoder 20 and video decoder 30. Therefore, for ease of explanation, video encoder 20 and video decoder 30 may at times jointly be referred to as video coder 20/30. Techniques described relative to video coder 20/30 may be performed either by video encoder 20 or video decoder 30.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. In accordance with the techniques of this disclosure, video decoder 30 may provide original and updated precision values for depth ranges and camera parameters to DIBR unit 31, which may use the depth ranges and camera parameters to properly synthesize views.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video coding standard, such as the High Efficiency Video Coding (HEVC) standard presently under development, and may conform to the HEVC Test Model (HM).

A recent draft of the upcoming HEVC standard is described in document HCTVC-J1003, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, Sweden, Jul. 11, 2012 to Jul. 12, 2012, which, as of 15 Aug. 2013, is downloadable from http://phenix.int-evey.fr/jct/doc_end_user/documents/10 Stockholm/wg11/JCTVC-J1003-v8.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of 15 Aug. 2013, is downloadable from http://phenix.intevry.fr/jct/doc_end_user/documents/12_Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which as of 3 Oct. 2013, is available from http://phenix.intevey.fr/jct/doc_end_user/documents/13_Incheon/wg11/JCTVC-M0432-v3.zip.

For purposes of illustration, the techniques of this disclosure are described primarily with respect to the 3DV extension of HEVC. However, it should be understood that these techniques may be applied to other standards for coding video data used to produce a three-dimensional effect as well.

A Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it is generally desired that there are only high-level syntax (HLS) changes relative to HEVC, such that no module in the CU/PU level in HEVC needs to be re-designed and can be fully reused for MV-HEVC. For 3D-HEVC, new coding tools, including those in coding at the unit/prediction unit level, for both texture and depth views may be included and supported. The latest software 3D-HTM for 3D-HEVC can be downloaded, as of 3 Oct. 2013, from the following link: https://hevc.hhi.fraunhofer.de/svn/svn_HEVCSoftware/trunk/.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, such as the MVC extension of ITU-T H.264/AVC. In particular, the techniques of this disclosure are related to multiview and/or 3D video coding based on advanced codecs. In general, the techniques of this disclosure may be applied to any of a variety of different video coding standards. For example, these techniques may be applied to the multi-view video coding (MVC) extension of ITU-T H.264/AVC (advanced video coding), to a 3D video (3DV) extension of the upcoming HEVC standard (e.g., 3D-HEVC), or other coding standard.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Initially, example coding techniques of HEVC will be discussed. The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three angular intra-prediction encoding modes plus DC and Planar modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or merge mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

The following describes some relevant HEVC techniques relating to inter-prediction that may be used with multiview coding and/or multiview coding (MV-HEVC) with depth (3D-HEVC). The first technique for discussion is reference picture list construction for inter-prediction.

Coding a PU using inter-prediction involves calculating a motion vector between a current block (e.g., PU) and a block in a reference frame. Motion vectors are calculated through a process called motion estimation (or motion search). A motion vector, for example, may indicate the displacement of a prediction unit in a current frame relative to a reference block of a reference frame. A reference block may be a block that is found to closely match the portion of the CU including the PU being coded in terms of pixel difference, which may be determined by sum of absolute difference (SAD), sum of squared difference (SSD), or other difference metrics. The reference block may occur anywhere within a reference frame or reference slice. In some examples, the reference block may occur at a fractional pixel position, in which case values for pixels of the reference block may be calculated from other pixel values in the reference frame using interpolation, e.g., bilinear interpolation. Upon finding a portion of the reference frame that best matches the current portion, the encoder determines the current motion vector for the current block as the difference in the location from the current block to the matching portion in the reference frame (e.g., from the center of the current block to the center of the matching portion).

In some examples, an encoder may signal the motion vector for each block in the encoded video bitstream. The signaled motion vector is used by the decoder to perform motion compensation in order to decode the video data. However, signaling the original motion vector directly may result in less efficient coding, as a large number of bits are typically needed to convey the information.

In some instances, rather than directly signaling the original motion vector, the encoder may predict a motion vector for each partition, i.e., for each PU. In performing this motion vector prediction, the encoder may select a set of motion vector candidates determined from spatially neighboring blocks in the same frame as the current block or a temporal motion vector candidate determined from a co-located block in a reference frame (i.e., a frame other than the current frame). Video encoder 20 may perform motion vector prediction, and if needed, signal an index to a reference picture to predict the motion vector, rather than signal an original motion vector, to reduce bit rate in signaling. The motion vector candidates from the spatially neighboring blocks may be referred to as spatial MVP candidates, whereas the motion vector candidates from co-located blocks in another reference frame may be referred to as temporal MVP candidates.

Two different modes or types of motion vector prediction are proposed in the HEVC standard. One mode is referred to as a "merge" mode. The other mode is referred to as adaptive motion vector prediction (AMVP).

In merge mode, video encoder 20 instructs video decoder 30, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected motion vector candidate for a current block of the frame. This is accomplished by signaling in the bitstream an index into a motion vector candidate list identifying the selected motion vector candidate (i.e., the particular spatial MVP candidate or temporal MVP candidate).

Thus, for merge mode, the prediction syntax may include a flag identifying the mode (in this case "merge" mode) and an index identifying the selected motion vector candidate. In some instances, the motion vector candidate will be in a an already coded block in reference to the current block. That is, the motion vector candidate will have already been decoded by video decoder 30. As such, video decoder 30 has already received and/or determined the motion vector, reference index, and motion prediction direction for the causal block. Accordingly, video decoder 30 may simply retrieve the motion vector, reference index, and motion prediction direction associated with the causal block from memory and copy these values as the motion information for the current block. To reconstruct a block following reconstruction of a motion vector for the block using merge mode, video decoder 30 obtains a predictive block using the derived motion information for the current block, and adds residual data to the predictive block to reconstruct the block.

Note, for the skip mode, the same merge candidate list is generated but no residual is signaled. For simplicity, since skip mode has the same motion vector derivation process as merge mode, all techniques described in this document with respect to merge mode apply to both merge and skip modes.

In AMVP, video encoder 20 instructs video decoder 30, through bitstream signaling, to only copy the motion vector from the candidate block and use the copied vector as a predictor for motion vector of the current block, and signals the motion vector difference (MVD). The reference frame and the prediction direction associated with the motion vector of the current block are signaled separately. An MVD is the difference between the current motion vector for the current block and a motion vector predictor derived from a candidate block. In this case, video encoder 20, using motion estimation, determines an actual motion vector for the block to be coded, and then determines the difference between the actual motion vector and the motion vector predictor as the MVD value. In this way, video decoder 30 does not use an exact copy of the motion vector candidate as the current motion vector, as in the merge mode, but may rather use a motion vector candidate that may be "close" in value to the current motion vector determined from motion estimation and add the MVD to reproduce the current motion vector. To reconstruct a block in AMVP mode, the decoder adds the corresponding residual data to reconstruct the coded block.

In most circumstances, the MVD requires fewer bits to signal than the entire current motion vector. As such, AMVP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AMVP may include a flag for the mode (in this case AMVP flag), the index for the candidate block, the MVD between the current motion vector and the predictive motion vector from the candidate block, the reference index, and the motion prediction direction.

Figure 2:
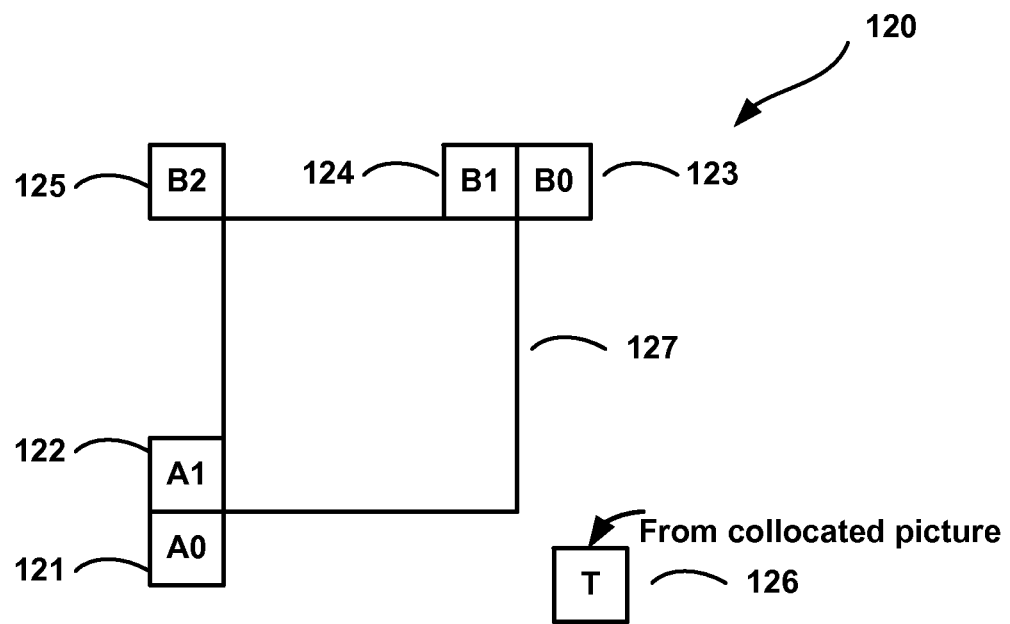
FIG. 2 shows an example set of candidate blocks that may be used in both merge mode and AMVP mode.

FIG. 2 shows an example set of candidate blocks 120 that may be used in merge mode. Different candidate blocks, or potentially the same candidate blocks, may be used in an AMVP mode. In this example, the candidate blocks are in the below left (A0) 121, left (A1) 122, left above (B2) 125, above (B1) 124, and right above (B0) 123 spatial positions, and in the temporal (T) 126 position(s). In this example, the left candidate block 122 is adjacent the left edge of the current block 127. The lower edge of the left block 122 is aligned with the lower edge of the current block 127. The above block 124 is adjacent to the upper edge of the current block 127. The right edge of the above block 124 is aligned with the right edge of the current block 127.

Blocks $A_0$, $A_1$, $B_0$, $B_1$ and $B_2$ are commonly referred to as spatially neighboring blocks or spatially neighboring PUs. Video coder 20/30 may determine the locations of the spatially neighboring blocks by first determining the location of the top-left luma sample of the current PU (e.g., block 127 in FIG. 2) relative to the top-left sample of the current picture. This luma location will be referred to as location (xP, yP). Video coder 20/30 may additionally determine the width of the luma PU (abbreviated nPSW) and the height of the luma PU (abbreviated nPSH). Based on the location of the top-left luma sample of the current PU and the height and width of the current PU, the location of a luma sample of the spatial neighboring blocks can be determined as follows:

block A0 includes the luma sample at location (xP−1, yP+nPSH);

block A1 includes the luma sample at location (xP−1, yP+nPSH−1);

block B0 includes the luma sample at location (xP+nPSW, yP−1);

block B1 includes the luma sample at location (xP+nPSW−1, yP−1);

block B2 includes the luma sample at location (xP−1, yP−1).

The spatial neighboring blocks may either be the same size or may be different sizes than the current PU.

A candidate list for use in merge mode can be derived using the spatial neighboring blocks discussed above. The motion vectors and the reference indices for both reference lists may be derived as specified by the following ordered steps, which are an example of a derivation process for spatial merging candidates. As part of the derivation process, video encoder 20 and video decoder 20 check the motion information of spatial neighboring PUs in the following order: $A_1$, $B_1$, $B_0$, $A_0$, or $B_2$. Video encoder 20 and video decoder 30 may perform constrained pruning in order to reduce or eliminate duplicate candidates from being added to the candidate list. Video coder 20/30 may derive the spatial candidates that are to be included in the merge mode candidate list as follows:

Video coder 20/30 inserts $A_1$ into the candidate list if $A_1$ is available.

If $B_1$ and $A_1$ have the same motion vectors and the same reference indices, then video coder 20/30 does not insert $B_1$ into the candidate list. If $B_1$ and $A_1$ do not have the same motion vectors and the same reference indices, then video coder 20/30 inserts $B_1$ into the candidate list, if $B_1$ is available.

If $B_0$ and $B_1$ have the same motion vectors and the same reference indices, then video coder 20/30 does not insert $B_0$ into the candidate list. If $B_0$ and $B_1$ do not have the same motion vectors and the same reference indices, then video coder 20/30 inserts $B_0$ into the candidate list, if $B_0$ available.

If $A_0$ and $A_1$ have the same motion vectors and the same reference indices, then video coder 20/30 does not insert $A_0$ into the candidate list. If $A_0$ and $A_1$ do not have the same motion vectors and the same reference indices, then video coder 20/30 inserts $A_0$ into the candidate list, if $A_0$ is available.

Video coder 20/30 inserts $B_2$ into the candidate list when both of the following conditions are not satisfied:
  $B_2$ and $B_1$ or $B_2$ and $A_1$ have the same motion vectors and the same reference indices.
  All of the four spatial merging candidates derived from $A_1, B_1, B_0, A_0$ are included in the candidate list.

Video coder 20/30 may derive the temporal candidate that is to be included in the merge mode candidate list as follows:
  To get the temporal merging candidate, video coder 20/30 first identifies a co-located picture. If the current picture is a B slice, a syntax element "collocated_from_l0_flag" is signaled in the slice header to indicate whether the co-located picture is from RefPicList0 or RefPicList1.
  After video coder 20/30 identifies a reference picture list, video coder 20/30 uses the syntax element collocated_ref_idx, signaled in slice header, to identify the picture in the picture in the list.
  Video coder 20/30 then identifies a co-located PU by checking the co-located picture. Video coder 20/30 uses either the motion of the right-bottom PU of the CU containing this PU, or the motion of the right-bottom PU within the center PUs of the CU containing this PU as the temporal candidate.
  When motion vectors identified by the above process are used to generate a motion candidate for merge mode, video coder 20/30 may need to scale the motion vectors based on the temporal location (reflected by picture order count, i.e., POC).

In HEVC, the PPS includes a flag enable_temporal_mvp_flag. When a particular picture with temporal_id equal to 0 refers to a PPS having enable_temporal_mvp_flag equal to 0, video coder 20/30 may mark all the reference pictures in the DPB "unused for temporal motion vector prediction," and no motion vector from pictures before that particular picture in decoding order would be used as a temporal motion vector predictor in decoding of the particular picture or a picture after the particular picture in decoding order.

If the current slice is a B slice and the total number of candidates derived from the spatial and temporal candidate derivation processes described above is less than the maximum number of candidates and greater than 1, then video coder 20/30 may invoke a process for generating bi-predictive candidates. Video coder 20/30 may derive the bi-predictive candidates that are to be included in the merge mode candidate list as follows:

Base on Table 1 below, to generate a combined bi-predictive candidate with index combIdx, the RefList0 motion information (MotList0) of the candidate list with entry equal to l0CandIdx if available and the RefList1 motion information (MotList1) of the candidate list with entry equal to l1CandIdx if available and not identical to MotList0 may be re-used by video coder 20/30 as the RefList0 and RefList1 motion information of the combined bi-predictive candidate.

TABLE 1

Specification of l0CandIdx and l1CandIdx in HEVC

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

Video coder 20/30 may derive the zero motion vector candidates that are to be included in the merge mode candidate list if the total number of candidates derived from the above three processes described above for determining spatial, temporal, and bi-predictive candidates produces less than the maximum number of candidates. In such an instance, video coder 20/30 may insert a zero motion vectors for each reference picture into the candidate list.

In HEVC WD 10, the total number of candidates in the MRG list is up to 5 and five_minus_max_num_merge_cand is signaled to specify the maximum number of the MRG candidates subtracted from 5 in slice header. Given the total number N of candidates derived by (5-five_minus_max_num_merge_cand), the first N candidates in the merge candidate list are selected, and one of them may be chosen for coding a motion vector for the current prediction unit. In other words, once N candidates have been inserted to the merge candidate list, there is no need to insert more candidates, and the merge list construction process may be terminated.

In 3D-HEVC, each access unit contains multiple view components, each containing a unique view id, view order index, layer id, or some other such identifier. A view component contains a texture view component as well as a depth view component. A texture view component is coded as one or more texture slices, while the depth view component is coded as one or more depth slices. In some cases, the texture view component and the depth view component have different spatial resolutions.

3D video data may be represented using the multiview video plus depth format, in which captured views (texture) are associated with corresponding depth maps. In 3D video coding, textures and depth maps are coded and multiplexed into a 3D video bitstream. Depth maps are coded as a grayscale video where the luma samples represent the depth values, and conventional intra- and inter-coding methods can be applied for depth map coding.

As introduced above, MPI is a coding tool for depth in 3D-HEVC that is currently used as part of the merge mode. When MPI is enabled, at the sequence level, for example, the motion information, associated coding structure, and split information of the co-located block in the associated texture view component may be used by a current block in the depth view component. Therefore, there is no need to transmit the motion information in the bitstream. As discussed above, the depth view component and the texture view component may have different spatial resolutions. Thus, the phrase "co-located block" should be understood to refer to the block in the texture view component that corresponds to the block of the depth view component, which may include accounting for differences in spatial resolutions between the texture and depth view components.

To signal whether MPI is used for a depth block, a flag is used, denoted by bMPIUsed. For example, when MPI is used as the final coding mode for one prediction unit, bMPIUsed may be set equal to 1. When MPI is enabled for one depth view component, the motion information (including motion vectors, reference indices), associated coding structure, and split information are inherited from the texture view component and inserted into the merge candidate list, the maximum size of which is increased by 1 (which becomes 6). That is, this flag is treated as a special merge candidate with index set equal to 0 and the index of other merge candidates (spatial/temporal/combined bi-predictive/ zero motion vector merging candidates) are increased by 1.

For simplicity, the motion vector candidate derived under the MPI mode will be referred to in this disclosure as an MPI candidate.

The current design of MPI in 3D-HEVC may have some shortcomings. As one example, it is always assumed that the MPI candidate has a higher priority than all the merging candidates, which may reduce the coding efficiency for some sequences, e.g., where the usage of merging candidates may have a higher probability than that of the MPI candidate. As another example, MPI directly reuses the motion information and coding structure of co-located blocks in a base view where it may be further used as a predictor of current motion information.

This disclosure proposes techniques related to MPI for 3D-HEVC that may address some of the shortcomings of existing techniques. According to one technique of this disclosure, instead of transmitting a flag indicating MPI is used and deriving the MPI candidate to have index equal to 0, video coder 20/30 may treat the motion information of the co-located block in a texture view as a merge candidate with a merge index signaled, similar to other candidates in a merge list where only motion information without coding structure is inherited.

According to another technique of this disclosure, video coder 20/30 may add the MPI candidate into a merge candidate list such that the MPI candidate has an index greater than 0, for example, an index equal to 1. Alternatively, video coder 20/30 may add the MPI candidate into a merge candidate list such that the MPI candidate has an index of 2, 3, 4, 5, or any other available index. For example, video coder 20/30 may add the MPI candidate immediately before the temporal merging candidate in the list, after the first spatial candidate is added into the merge candidate list, or immediately after N spatial candidates have been checked, with N equal to 0, 1, 2 and 3. In some examples, when MPI is treated as a merge candidate, the corresponding index can be adaptively changed within one slice or one picture. Thus, video encoder 20 can signal to video decoder 30 the merge index for that slice or picture, or video decoder 30 may determine the merge index for that slice or picture based on context information (e.g., based on information related to previously decoded blocks).

According to another technique of this disclosure, video coder 20/30 may use the motion information of the co-located block in texture view as an additional candidate for AMVP mode. In such instances, the AMVP candidate list size may be increased by 1. In other example, the AMVP candidate list size may be not altered, and the MPI candidate may take the place of an otherwise included candidate. For example, the MPI candidate may replace the temporal AMVP candidate. Video coder 20/30 may assign any index to the MPI candidate. For example, video coder 20/30 may assign the MPI candidate an index of N, where N could be 0, 1, 2, or any other value.

Figure 3:
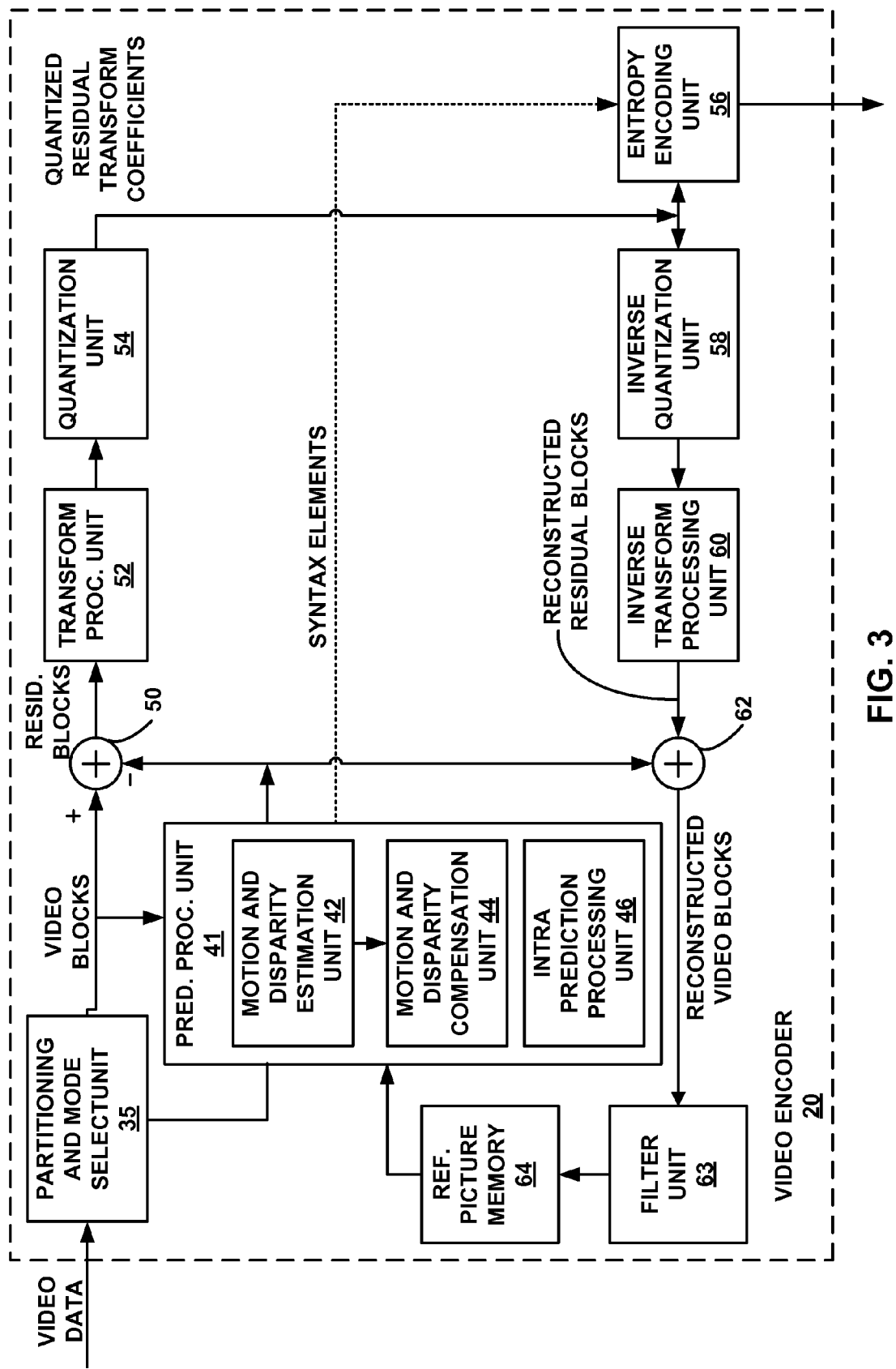
FIG. 3 is a block diagram illustrating an example of a video encoder that may implement the inter-prediction techniques of this disclosure.

FIG. 3 is a block diagram illustrating an example video encoder 20 that may implement the techniques described in this disclosure, including the inter-view prediction techniques described above. Video encoder 20 may perform intra- and inter-coding of video blocks within video slices. Intra-coding relies on spatial prediction to reduce or remove spatial redundancy in video within a given video frame or picture. Inter-coding relies on temporal prediction and/or inter-view prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based and/or inter-view based compression modes.

In the example of FIG. 3, video encoder 20 includes a partitioning and mode select unit 35, prediction processing unit 41, filter unit 63, reference picture memory 64, summer 50, transform unit 52, quantization unit 54, and entropy encoding unit 56. Prediction processing unit 41 includes motion and disparity estimation unit 42, motion and disparity compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 3 as being an in loop filter, in other configurations, filter unit 63 may be implemented as a post loop filter.

As shown in FIG. 3, video encoder 20 receives video data, and partitioning and mode select unit 35 partitions the data into video blocks. This partitioning may also include partitioning into slices, tiles, or other larger units, as wells as video block partitioning, e.g., according to a quadtree structure of LCUs and CUs. Partitioning and mode select unit 35 tests various types of partitioning, using for example, rate distortion optimization (RDO), to select the best set of combinations of partitioning and coding modes for a slice or frame. In order to test various coding modes, partitioning and mode select unit 35 may, in some instances, be highly integrated with prediction processing unit 41. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or interview coding of the current video block relative to one or more predictive blocks in one or more reference pictures and/or reference views to provide temporal or view compression.

Partitioning and mode select unit 35, in conjunction with prediction processing unit 41, may be configured to determine the inter-prediction mode and/or interview prediction mode for a video slice according to a predetermined pattern for a video sequence. The predetermined pattern may designate video slices in the sequence as P slices, or B slices. Motion and disparity estimation unit 42 and motion and disparity compensation unit 44 may be highly integrated, but are illustrated separately for conceptual purposes. Motion and disparity estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity motion vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity motion vector (for disparity compensated prediction) for a PU of a video block in an inter-coded or interview predicted slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 42 sends the calculated motion vector and/or disparity vector to entropy encoding unit 56 and motion compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

In some examples, motion and disparity compensation unit 42 may generate syntax elements indicating motion vectors using a motion vector prediction process. The motion vector prediction processes may include an AMVP mode and a merge mode as described in this disclosure. For example, for a depth block in a depth view component, motion and disparity compensation unit 42 may derive an MPI candidate based on motion information of a corresponding texture block in a texture view component and add the MPI candidate to a candidate list for use in a motion vector prediction operation such as a merge mode operation or an AMVP operation. Motion and disparity compensation unit 42 may signal the motion vector used to encode a video block by generating, for inclusion in an encoded bitstream, an index of a candidate in the candidate list. Depending on whether the depth block is coded in a merge mode or an AMVP mode, the index may identify all the motion information to be used for decoding the depth block or may identify a motion vector predictor, that in conjunction with other signaled information, identifies the motion vector to be used for decoding the depth block.

Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform unit 52. Transform unit 52 transforms the residual video data into residual transform coefficients using a transform, such as a discrete cosine transform (DCT) or a conceptually similar transform. Transform unit 52 may convert the residual video data from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion and disparity compensation unit 44 may calculate a reference block by adding the residual block to a predictive block of one of the reference pictures within one of the reference picture lists. Motion and disparity compensation unit 44 may also apply one or more interpolation filters to the reconstructed residual block to calculate sub-integer pixel values for use in motion estimation. Summer 62 adds the reconstructed residual block to the motion compensated prediction block produced by motion and disparity compensation unit 44 to produce a reference block for storage in reference picture memory 64. The reference block may be used by motion and disparity estimation unit 42 and motion and disparity compensation unit 44 as a reference block to inter-predict a block in a subsequent video frame or picture.

Figure 4:
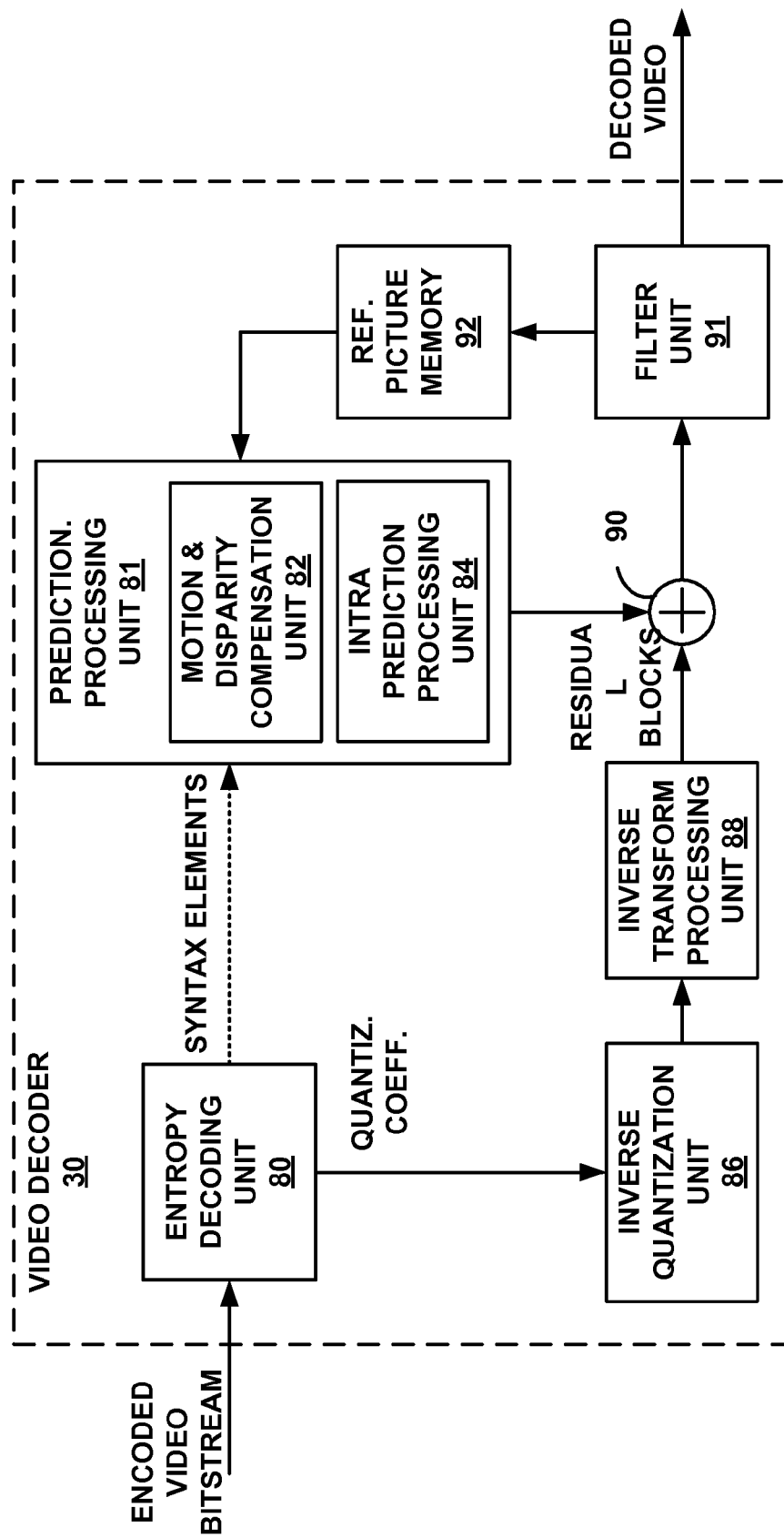
FIG. 4 is a block diagram illustrating an example of a video decoder that may implement the inter-prediction techniques of this disclosure.

FIG. 4 is a block diagram illustrating an example video decoder 30 that may implement the techniques described in this disclosure, including the inter-view prediction techniques described above. In the example of FIG. 4, video decoder 30 includes an entropy decoding unit 80, prediction processing unit 81, inverse quantization unit 86, inverse transformation processing unit 88, summer 90, filter unit 91, and reference picture memory 92. Prediction processing unit 81 includes motion and disparity compensation unit 82 and intra prediction processing unit 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion and disparity compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or inter-view prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

In some examples, motion and disparity compensation unit 82 may determine the signaled syntax elements indicating motion vectors using a motion vector prediction process. The motion vector prediction processes may include an AMVP mode and a merge mode as described in this disclosure. For example, for a depth block in a depth view component, motion and disparity compensation unit 82 may derive an MPI candidate based on motion information of a corresponding texture block in a texture view component and add the MPI candidate to a candidate list for use in a motion vector prediction operation such as a merge mode operation or an AMVP operation.

Motion and disparity compensation unit 82 may also perform interpolation based on interpolation filters. Motion and disparity compensation unit 82 may use interpolation filters as used by video encoder 20 during encoding of the video blocks to calculate interpolated values for sub-integer pixels of reference blocks. In this case, motion and disparity compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion and disparity compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 4 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 5:
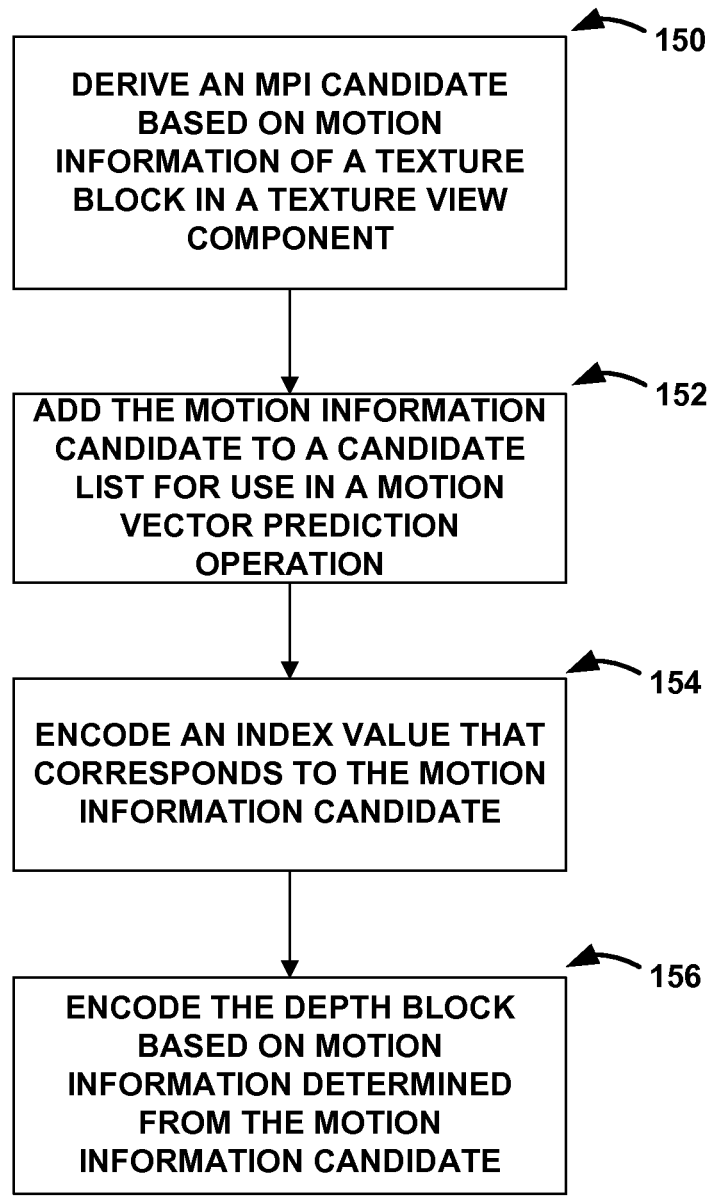
FIG. 5 is a flowchart showing an example encoding process according to the techniques of the disclosure.

FIG. 5 is a flowchart showing an example encoding process according to the techniques of the disclosure. The techniques of FIG. 5 will be described with respect to video encoder 20 but may be performed by other types of video encoders. For a video block in a depth view component, video encoder 20 derives a motion information candidate based on motion information of a corresponding block in a texture view component (150). The corresponding block may, for example, be a co-located block, accounting for potential differences in spatial resolution, in the texture view component. Video encoder 20 adds the motion information candidate to a candidate list for use in a motion vector prediction operation (152). Each candidate in the candidate list may have an associated index. The motion vector prediction operation may, for example, be an AMVP mode operation, a merge mode operation, or some other such motion vector prediction operation. When the motion vector prediction operation is an AMVP operation, video encoder 20 may use the motion information candidate as a motion vector predictor and encode motion vector difference information such that the motion information candidate and the motion vector difference information correspond to a motion vector used to code the depth block. When adding the motion information candidate to the candidate list for either of merge mode or AMVP mode, video encoder may assign the motion information candidate to any index, including indexes greater than 0.

Video encoder 20 may encode an index value that corresponds to the motion information candidate (154) and encode the current block based on motion information determined from the motion information candidate (156). In some examples, video encoder 20 generate, for inclusion in an encoded bitstream, a first syntax element indicating the motion information candidate is enabled. As used in this disclosure, adding the motion information candidate to the candidate list generally refers to adding the motion information of the co-located video block in a different view component of the same view to the candidate list used to code the current block. In some examples, coding structure information, such as partition information, associated with the co-located video block may not be included in the candidate list. Thus, a coding structure of the video block may be different than a coding structure of the co-located block in the second view.

Figure 6:
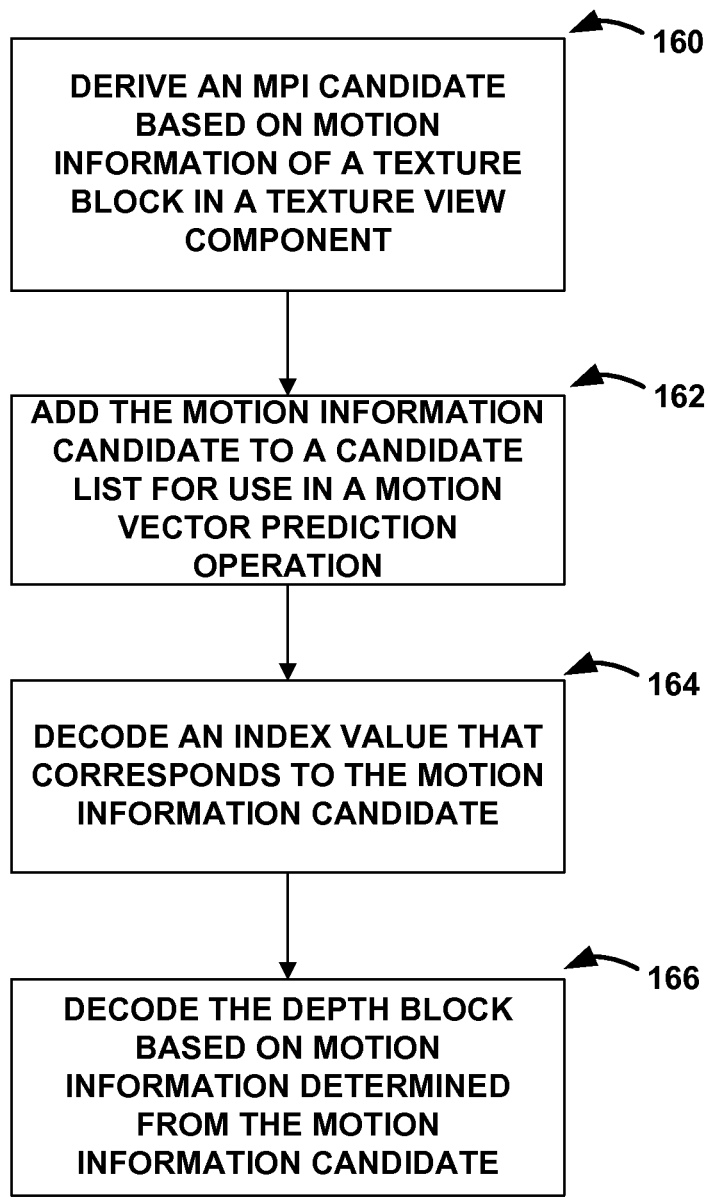
FIG. 6 is a flowchart showing an example decoding process according to the techniques of the disclosure.

FIG. 6 is a flowchart showing an example decoding process according to the techniques of the disclosure. The techniques of FIG. 6 will be described with respect to video decoder 30 but may be performed by other types of video decoder. For a video block in a depth view component, video decoder 30 derives a motion information candidate based on motion information of a corresponding block in a texture view component (160). The corresponding block may, for example, be a co-located block, accounting for potential differences in spatial resolution, in the texture view component. Video decoder 30 adds the motion information candidate to a candidate list for use in a motion vector prediction operation (162). Each candidate in the candidate list has an associated index. The motion vector prediction operation may, for example, be an AMVP mode operation, a merge mode operation, or some other such motion vector prediction operation. When the motion vector prediction operation is an AMVP operation, video decoder may use the motion information candidate as a motion vector predictor, receive motion vector difference information, and based on the motion information candidate and the motion vector difference information, determine a motion vector for decoding the video block. When adding the motion information candidate to the candidate list for either of merge mode or AMVP mode, video decoder 30 may assign the motion information candidate to any index, including indexes greater than 0.

Video decoder 30 may decode an index value that corresponds to the motion information candidate (164) and decode the current block based on motion information determined from the motion information candidate (166). In some examples, video decoder 30 may add the motion information candidate to the candidate list in response to receiving a first syntax element indicating the motion information candidate is enabled. As used in this disclosure, adding the motion information candidate to the candidate list generally refers to adding the motion information of the co-located video block in a different view component of the same view to the candidate list used to code the current block. In some examples, coding structure information associated with the co-located video block may not be included in the candidate list. Thus, a coding structure of the video block may be different than a coding structure of the co-located block in the second view.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding 3D video data, the method comprising:
   decoding a texture view component, wherein decoding the texture view component comprises predicting a texture block of the texture view component using motion information for the texture block;
   for a depth block in a depth view component, the depth block corresponding to the texture block, deriving a motion information candidate, wherein the motion information candidate comprises the motion information used to predict the corresponding texture block in the decoded texture view component;
   adding the motion information candidate to a candidate list for use in a motion vector prediction operation for predicting motion information of the depth block;
   decoding an index value that refers to the motion information candidate in the candidate list, wherein the candidate list includes the motion information candidate;
   decoding the motion information of the depth block using the motion information candidate based on the index value; and
   decoding the depth block using the decoded motion information, wherein decoding the depth block comprises predicting the depth block using samples of a reference depth view component identified by the decoded motion information.

2. The method of claim 1, wherein the motion vector prediction operation comprises a merge mode operation, and wherein each candidate in the candidate list has an associated index, and wherein the method further comprises:
   assigning the motion information candidate to an index equal to or greater than 0.

3. The method of claim 2, wherein the motion information candidate comprises motion information.

4. The method of claim 2, wherein a partitioning of the depth block is different than a partitioning of the corresponding texture block.

5. The method of claim 1, further comprising:
   adding at least one of a spatial candidate, a temporal candidate, and a virtual candidate to the candidate list.

6. The method of claim 1, wherein the corresponding texture block comprises a co-located block in the texture view component.

7. The method of claim 1, further comprising:
   decoding a syntax element indicating the motion information candidate is enabled; and,
   adding the motion information candidate to the candidate list in response to the syntax element.

8. The method of claim 1, wherein the motion vector prediction operation comprises an advanced motion vector prediction (AMVP) mode operation.

9. The method of claim 1, wherein the motion information candidate comprises a motion vector, and wherein the method further comprises:
   using the motion information candidate as a motion vector predictor;
   decoding motion vector difference information; and,
   based on the motion information candidate and the motion vector difference information, determining a motion vector for decoding the depth block.

10. A method of encoding 3D video data, the method comprising:
    decoding a texture view component, wherein decoding the texture view component comprises predicting a texture block of the texture view component using motion information for the texture block;
    for a depth block in a depth view component, the depth block corresponding to the texture block, deriving a motion information candidate, wherein the motion information candidate comprises the motion information used to predict the corresponding texture block in the decoded texture view component;
    adding the motion information candidate to a candidate list for use in a motion vector prediction operation for predicting information in the depth block;

encoding an index value that refers to the motion information candidate in the candidate list, wherein the candidate list includes the motion information candidate;

encoding the motion information of the depth block using the motion information candidate identified by the index value; and encoding the depth block using the motion information, wherein encoding the depth block comprises predicting the depth block using samples of a reference depth view component identified by the encoded motion information.

11. The method of claim 10, further comprising:
adding at least one of a spatial candidate, a temporal candidate, and a virtual candidate to the candidate list.

12. The method of claim 10, wherein the corresponding texture block comprises a co-located block in the texture view component.

13. The method of claim 10, further comprising:
encoding a syntax element indicating the motion information candidate is enabled.

14. The method of claim 10, wherein the motion vector prediction operation comprises a merge mode operation, and wherein each candidate in the candidate list has an associated index, and wherein the method further comprises:
assigning the motion information candidate to an index equal to or greater than 0.

15. The method of claim 14, wherein the motion information candidate comprises motion information.

16. The method of claim 14, wherein a partitioning of the depth block is different than a partitioning of the corresponding texture block.

17. The method of claim 10, wherein the motion vector prediction operation comprises an advanced motion vector prediction (AMVP) mode operation.

18. The method of claim 10, wherein the motion information candidate comprises a motion vector, and wherein the method further comprises:
using the motion information candidate as a motion vector predictor;
encoding motion vector difference information; and,
based on the motion information candidate and the motion vector difference information, encoding a motion vector for the depth block.

19. A device for decoding 3D video data, the device comprising:
a memory configured to store video data;
a video decoder configured to decode a texture view component, wherein decoding the texture view component comprises predicting a texture block of the texture view component using motion information for the texture block, for a depth block in a depth view component of the video data, the depth block corresponding to the texture block, derive a motion information candidate, wherein the motion information candidate comprises the motion information used to predict the corresponding texture block in the decoded texture view component; add the motion information candidate to a candidate list for use in a motion vector prediction operation for predicting motion information in the depth block; decode an index value that refers to the motion information candidate in the candidate list, wherein the candidate list includes the motion information candidate; decode the motion information of the depth block using the motion information candidate based on the index value, and decode the depth block using the decoded motion information, wherein decoding the depth block comprises predicting the depth block using samples of a reference depth view component identified by the decoded motion information.

20. The device of claim 19, wherein the motion vector prediction operation comprises a merge mode operation, and wherein each candidate in the candidate list has an associated index, and wherein the method further comprises:
assigning the motion information candidate to an index equal to or greater than 0.

21. The device of claim 20, wherein the motion information candidate comprises motion information.

22. The device of claim 20, wherein a partitioning of the depth block is different than a partitioning of the corresponding texture block.

23. The device of claim 19, wherein the video decoder is further configured to add at least one of a spatial candidate, a temporal candidate, and a virtual candidate to the candidate list.

24. The device of claim 19, wherein the corresponding texture block comprises a co-located block in the texture view component.

25. The device of claim 19, wherein the video decoder is further configured to receive a syntax element indicating the motion information candidate is enabled; and add the motion information candidate to the candidate list in response to the syntax element.

26. The device of claim 19, wherein the motion vector prediction operation comprises an advanced motion vector prediction (AMVP) mode operation.

27. The device of claim 19, wherein the motion information candidate comprises a motion vector, and wherein the video decoder is further configured to use the motion information candidate as a motion vector predictor; decode motion vector difference information; and, based on the motion information candidate and the motion vector difference information, determining a motion vector for decoding the depth block.

28. The device of claim 19, wherein the device comprises at least one of:
an integrated circuit;
a microprocessor; and
a wireless communication device that includes the video decoder.

29. A device for encoding video data, the device comprising:
a memory configured to store video data;
a video encoder configured to decode a texture view component, wherein decoding the texture view component comprises predicting a texture block of the texture view component using motion information for the texture block, for a depth block in a depth view component, the depth block corresponding to the texture block, derive a motion information candidate, wherein the motion information candidate comprises the motion information used to predict the corresponding texture block in the decoded texture view component; add the motion information candidate to a candidate list for use in a motion vector prediction operation for predicting motion information in the depth block; encode an index value that refers to the motion information candidate in the candidate list, wherein the candidate list includes the motion information candidate; encode the motion information of the depth block using the motion information candidate based on the index value; and encode the depth block using the decoded motion information, wherein encoding the depth block comprises predicting the depth block using samples of a reference depth view component identified by the encoded motion information.

30. The device of claim 29, wherein the video encoder is further configured to add at least one of a spatial candidate, a temporal candidate, and a virtual candidate to the candidate list.

31. The device of claim 29, wherein the corresponding texture block comprises a co-located block in the texture view component.

32. The device of claim 29, wherein the video encoder is further configured to encode a syntax element indicating the motion information candidate is enabled.

33. The device of claim 29, wherein the motion vector prediction operation comprises a merge mode operation, and wherein each candidate in the candidate list has an associated index, and wherein the video encoder is further configured to assign the motion information candidate to an index equal to or greater than 0.

34. The device of claim 33, wherein the motion information candidate comprises motion information.

35. The device of claim 33, wherein a partitioning of the depth block is different than a partitioning of the corresponding texture block.

36. The device of claim 29, wherein the motion vector prediction operation comprises an advanced motion vector prediction (AMVP) mode operation.

37. The device of claim 29, wherein the motion information candidate comprises a motion vector, and wherein the video encoder is further configured to use the motion information candidate as a motion vector predictor; encode motion vector difference information; and, based on the motion information candidate and the motion vector difference information, encode a motion vector for the depth block.

38. The device of claim 29, wherein the device comprises at least one of:
 an integrated circuit;
 a microprocessor; and
 a wireless communication device that includes the video decoder.

39. A non-transitory computer-readable storage medium storing instructions that when executed by one or more processors cause the one or more processors to:
 decoding a texture view component, wherein decoding the texture view component comprises predicting a texture block of the texture view component using motion information for the texture block;
 for a depth block in a depth view component, the depth block corresponding to the texture block, derive a motion information candidate, wherein the motion information candidate comprises the motion information used to predict the corresponding texture block in the decoded texture view component;
 add the motion information candidate to a candidate list for use in a motion vector prediction operation for predicting motion information in the depth block;
 decode an index value that refers to the motion information candidate in the candidate list, wherein the candidate list includes the motion information candidate;
 decode the motion information of the depth block using the motion information candidate based on the index value; and
 decode the depth block using the decoded motion information, wherein decoding the depth block comprises predicting the depth block using samples of a reference depth view component identified by the decoded motion information.

40. The computer-readable storage medium of claim 39, wherein the motion vector prediction operation comprises a merge mode operation, and wherein each candidate in the candidate list has an associated index, and wherein the computer-readable storage medium stores further instructions that when executed cause the one or more processors to assign the motion information candidate to an index equal to or greater than 0.

41. The computer-readable storage medium of claim 39, wherein a partitioning of the depth block is different than a partitioning of the corresponding texture block.

42. The computer-readable storage medium of claim 39, storing further instructions that when executed cause the one or more processors to receive the index value, wherein the index value corresponds to the motion information candidate; and, decode the depth block based on motion information determined from the motion information candidate based on the received index value.

43. An apparatus for encoding 3D video data, the apparatus comprising:
 means for decoding a texture view component, wherein decoding the texture view component comprises predicting a texture block of the texture view component using motion information for the texture block;
 means for deriving a motion information candidate for a depth block in a depth view component, the depth block corresponding to the texture block, wherein the motion information candidate comprises the motion information used to predict the corresponding texture block in the decoded texture view component;
 means for adding the motion information candidate to a candidate list for use in a motion vector prediction operation for predicting motion information in the depth block;
 means for encoding an index value that refers to the motion information candidate in the candidate list, wherein the candidate list includes the motion information candidate;
 means for encoding the motion information of the depth block using the motion information candidate identified by the index value; and
 means for encoding the depth block using the motion information wherein encoding the depth block comprises predicting the depth block using samples of a reference depth view component identified by the encoded motion information.

* * * * *